A. M. LAYCOCK.
ROLLER BEARING.
APPLICATION FILED AUG. 23, 1917.
1,249,784.
Patented Dec. 11, 1917.
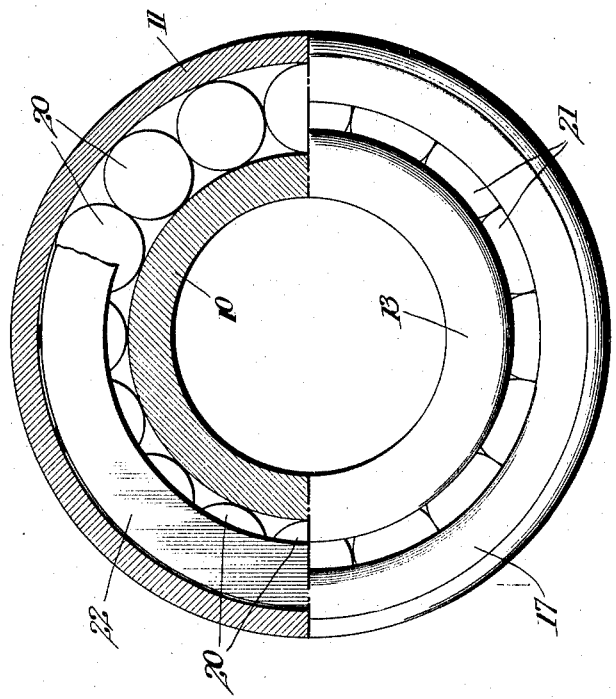
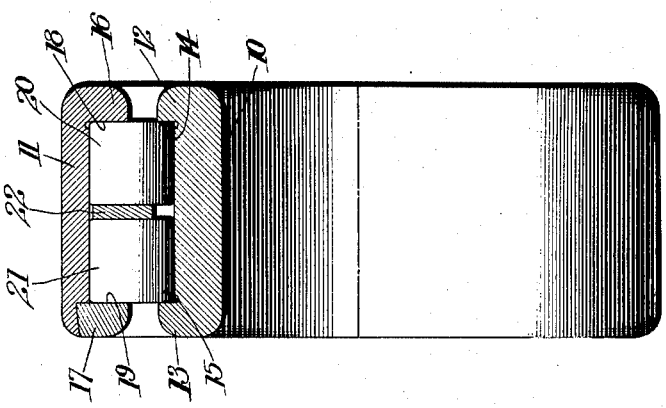

UNITED STATES PATENT OFFICE.

ARTHUR M. LAYCOCK, OF KINGSTON, PENNSYLVANIA.

ROLLER-BEARING.

1,249,784.  Specification of Letters Patent.  Patented Dec. 11, 1917.

Application filed August 23, 1917. Serial No. 187,883.

*To all whom it may concern:*

Be it known that I, ARTHUR M. LAYCOCK, formerly a subject of the King of Great Britain, but having taken out my first naturalization papers in the United States, residing at Kingston, Luzerne county, State of Pennsylvania, have invented certain new and useful Improvements in Roller-Bearings, of which the following is a specification.

This invention relates to that type of roller bearing disclosed and claimed in my Patent No. 1,200,445. In that form of bearing rollers are used instead of balls, and the rollers are made with ends at right angles to the axis of rotation constituting flat surfaces of contact to take the end thrust. In other words, the end thrust is not taken upon a point or a line but on an extended flat surface. This does not increase the friction but on the contrary decreases it, since a film of lubricant remains between the surfaces and prevents abrasion of the surface and the friction due to abrasion. Bearings which have a line or point contact are apt to be injured by a pounding effect in use which forms and gradually enlarges indentations in the surfaces, called the Brinnel effect. The use of a flat surface of contact furthermore enables one to figure the axial loads in unit pressures per square inch. In the use of roller bearings it is often desirable to have long surfaces of contact, but as pointed out in my patent above mentioned it is not possible to use rollers of materially greater length than diameter where they are intended to take end thrust because of the liability to tip and bind. It is therefore advisable to use more than one series of rollers in order to get the desired length of contact, each roller having a diameter not much, if any, less than its length. My present invention relates to roller bearings of the type above described, and as shown is embodied in what is called a full type bearing as distinguished from one having spacers. It has been my object to improve and simplify such bearing, contributing to the ease of manufacture and assembling of the parts, and reducing the expense while at the same time adding to the efficiency. The novel features of the invention will be apparent from the following description taken in connection with the accompanying drawings:

Figure 1 is a cross section through my bearing taken on a plane through the axis of rotation; and Fig. 2 is a similar view taken at right angles to the axis.

The bearing shown is of the double row full type, embodying the inner ring 10 and the outer ring 11. The inner ring 10 is provided with outwardly extending end flanges 12, 13, having flat inner faces, 14, 15, of considerable extent at right angles to the axis of the rollers which are adapted to fit within the ring. The outer ring 11 is provided with inwardly extending end flanges, 16, 17, having flat inner faces, 18, 19, of considerable extent in the same planes as the faces 14, 15. The surfaces of the rings 10 and 11 between the end flanges are continuous and smooth from one end flange to the other, and two sets of rollers 20, 21, fit between them. The rollers 20, 21, as shown are of only slightly greater length than diameter to prevent tipping and binding as above described, the rollers of each set fitting against each other at the periphery constituting full sets of bearings. Between the sets of rollers 20, 21, I place a thin flat ring 22 which is loosely mounted, being secured to neither of the rings 10 and 11. The floating ring 22 is made of hardened steel and it serves to transmit end thrust from one set of rollers to the other, that end thrust being taken on the extended flat surfaces of contact on the ring and rollers at right angles to the axis of the rollers. For ease in getting the ring 22 in place its inner diameter is preferably such that it will pass over the flanges 12 and 13 on ring 10. In order to assemble the bearing, one of the end flanges 12, 13, 16 and 17, is made as a separate piece and is secured in place after the rollers and ring 22 have been inserted.

In the drawing I have shown the flange 17 as made separately. The flat ring 22 extends at its outer margin approximately to the inner surface of the ring 11 so as to furnish an extended bearing to receive the end thrust. This floating ring occupies little space in the bearing, and being a separate article may be made very easily, very accurately and very cheaply.

Having described my invention, what I claim and desire to secure by Letters Patent is:

1. In a roller bearing the combination with an inner ring and an outer ring, of two longitudinally separated sets of cylindrical rollers between said rings, the said rollers having flat ends at right angles to the axis, a floating ring with flat sides between said sets of rollers and against which the flat ends of said rollers bear in taking end thrust, and end flanges on said inner and outer rings having flat surfaces adapted to bear against the flat ends of said rollers.

2. In a roller bearing the combination with an inner ring and an outer ring, of two longitudinally separated sets of cylindrical rollers between said rings, the said rollers having lengths not materially greater than their diameters and having flat ends at right angles to the axis, a floating ring with flat sides between said sets of rollers and against which the flat ends of said rollers bear in taking end thrust, and end flanges on said inner and outer rings having flat surfaces adapted to bear against the flat ends of said rollers.

3. In a roller bearing, the combination with an inner ring having external end flanges of an outer ring having internal end flanges, of two sets of cylindrical rollers in said bearing between said end flanges, and a floating ring between said sets of rollers.

4. In a roller bearing, the combination with an inner ring having external end flanges of an outer ring having internal end flanges, of two sets of cylindrical rollers in said bearing between said end flanges, and a floating ring between said sets of rollers, one marginal diameter of said floating ring being such as to permit it to pass in between said inner and outer rings notwithstanding the end flanges on one of said rings.

In testimony whereof I affix my signature.

ARTHUR M. LAYCOCK.